Dec. 6, 1938. F. R. HOUSE 2,139,636
NOCTURNAL ANTIAIRCRAFT FIRE CONTROL DEVICE
Filed May 21, 1937 5 Sheets-Sheet 1
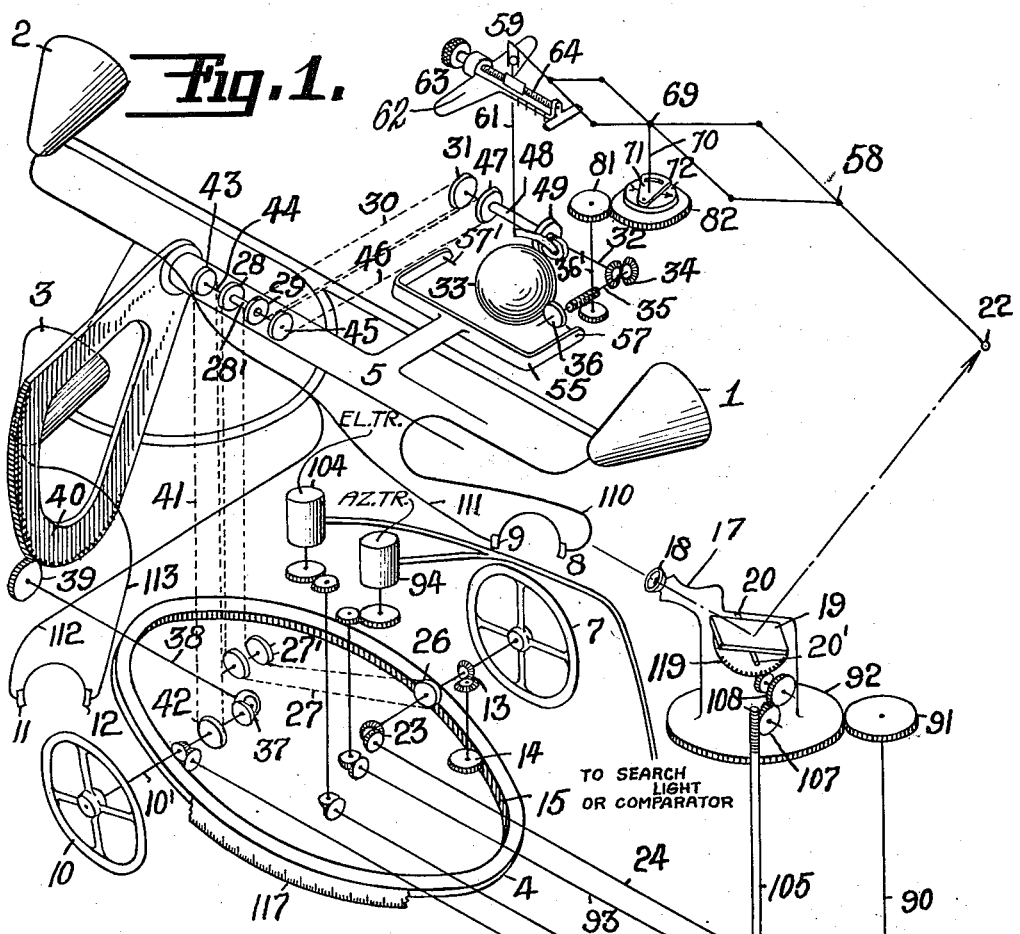
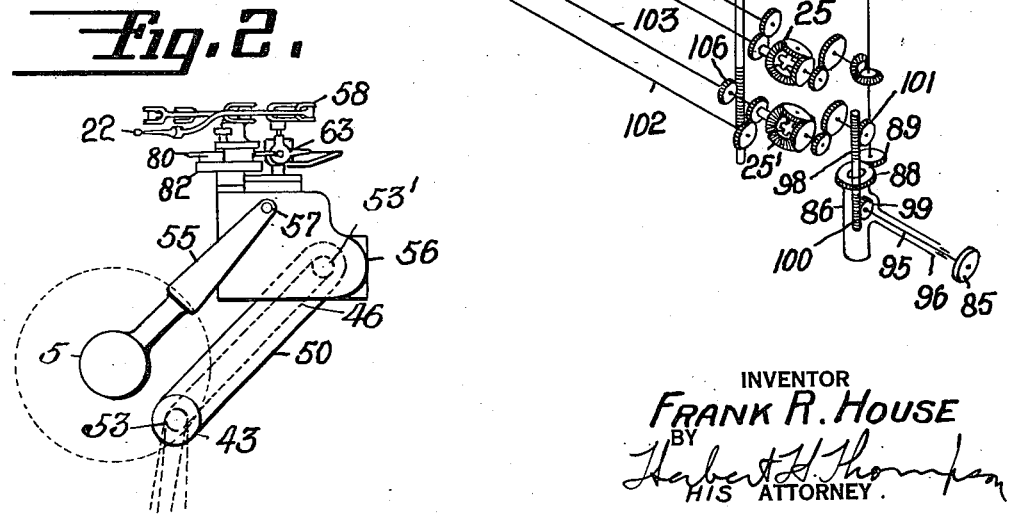
INVENTOR
FRANK R. HOUSE
BY
HIS ATTORNEY.

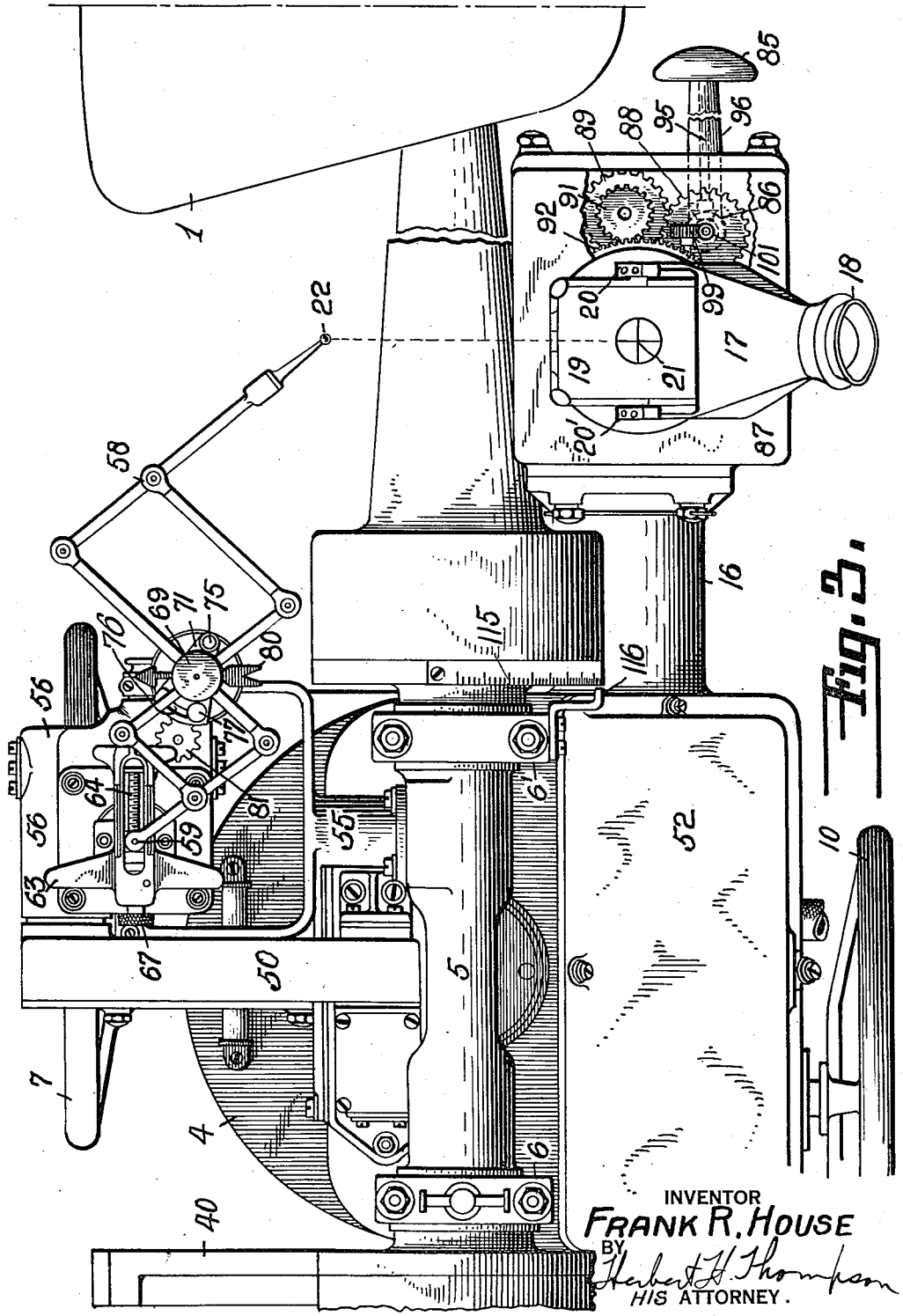

Dec. 6, 1938.   F. R. HOUSE   2,139,636
NOCTURNAL ANTIAIRCRAFT FIRE CONTROL DEVICE
Filed May 21, 1937   5 Sheets-Sheet 3
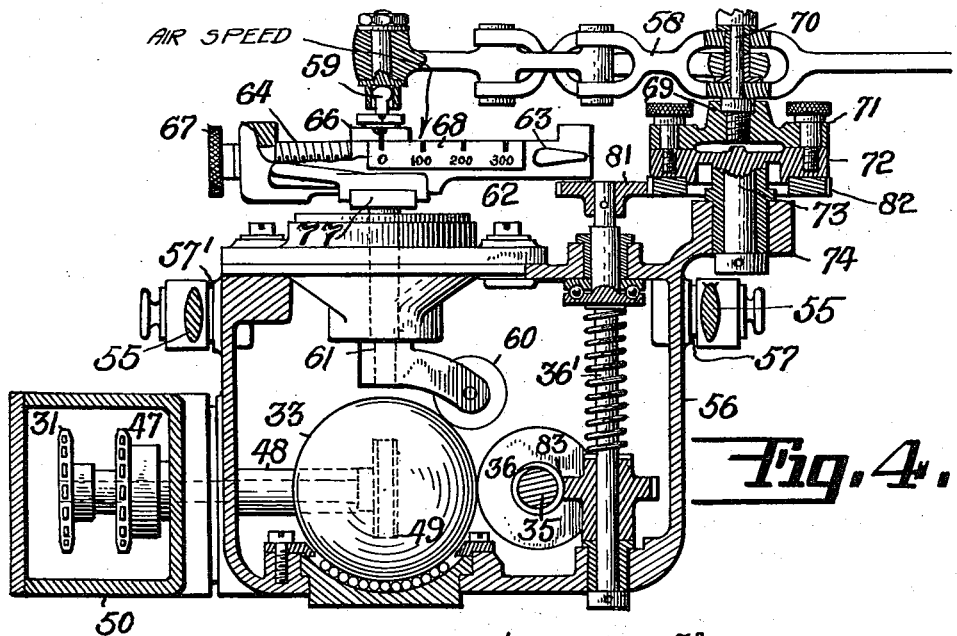
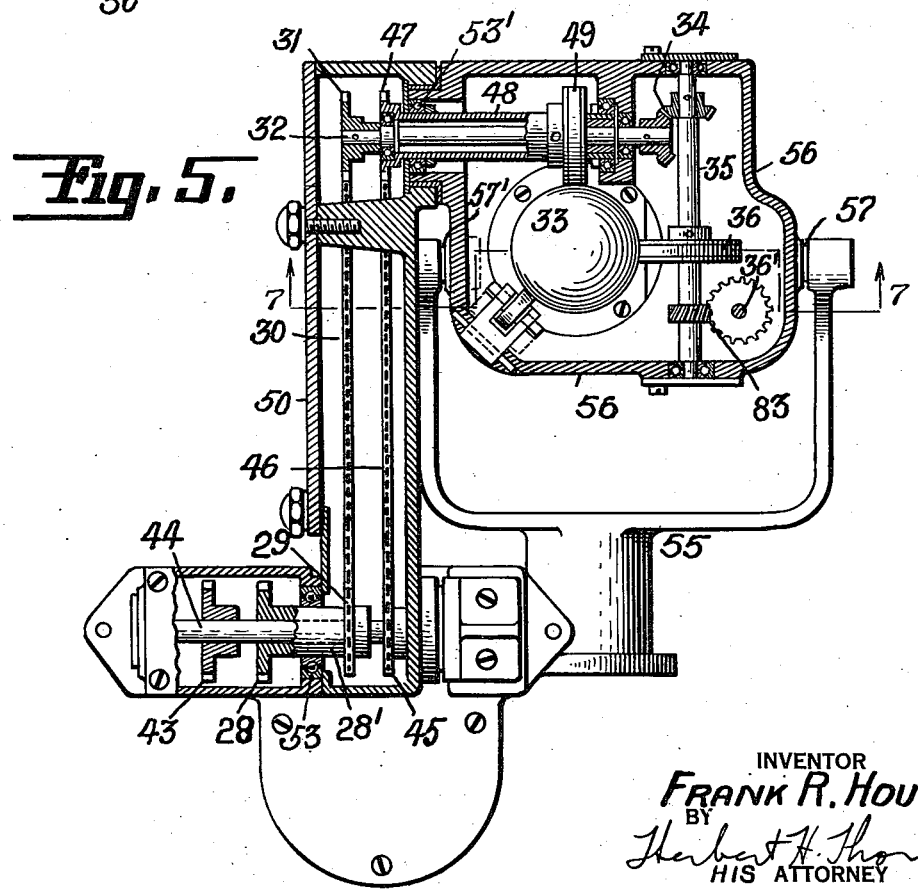
INVENTOR
FRANK R. HOUSE
BY
HIS ATTORNEY Dec. 6, 1938.  F. R. HOUSE  2,139,636
NOCTURNAL ANTIAIRCRAFT FIRE CONTROL DEVICE
Filed May 21, 1937  5 Sheets-Sheet 4
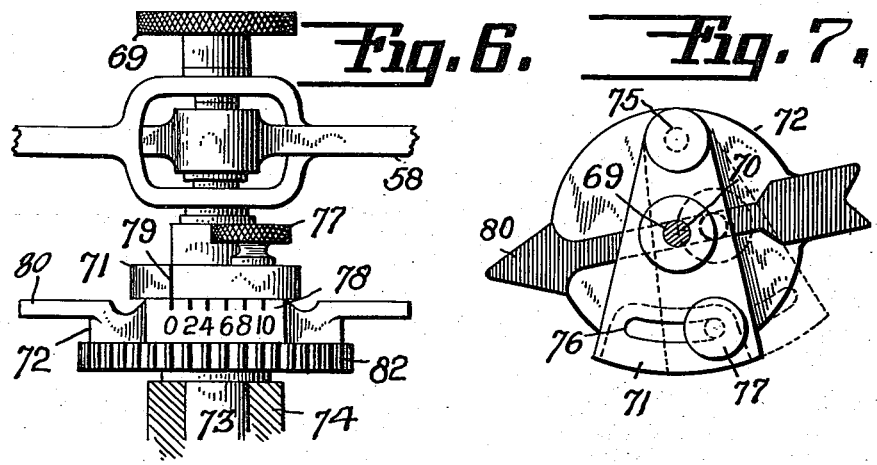
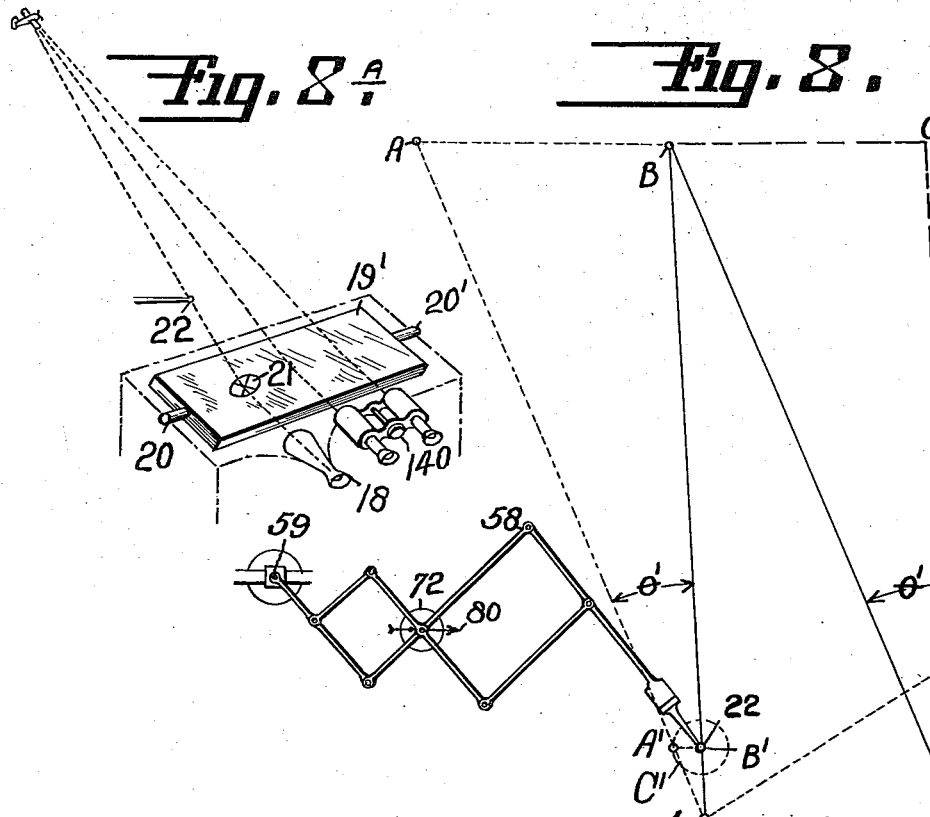
INVENTOR
FRANK R. HOUSE
BY
HIS ATTORNEY.

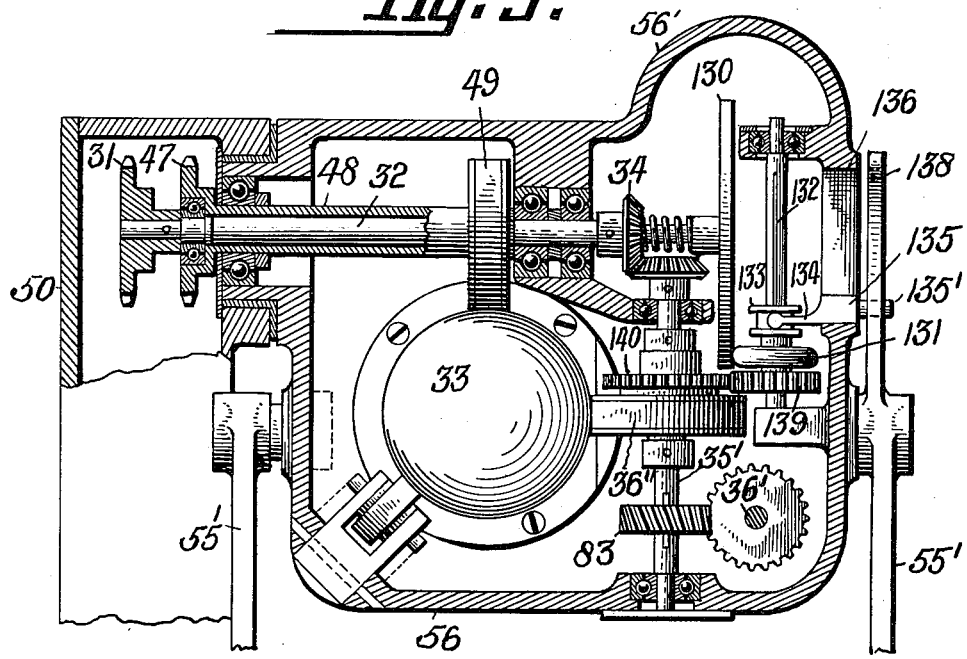
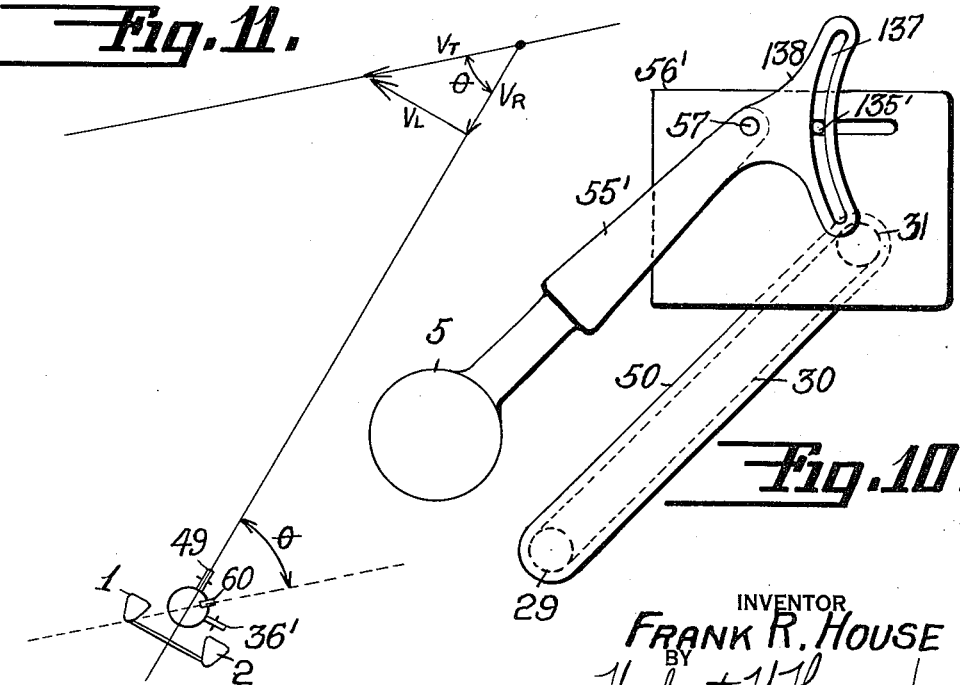

Patented Dec. 6, 1938

2,139,636

UNITED STATES PATENT OFFICE 2,139,636

NOCTURNAL ANTIAIRCRAFT FIRE CONTROL DEVICE

Frank R. House, Baldwin Harbor, N. Y., assignor to Sperry Gyroscope Company, Inc., Brooklyn, N. Y., a corporation of New York Application May 21, 1937, Serial No. 144,018

10 Claims. (Cl. 33—46)

This invention relates to nocturnal anti-aircraft fire control devices, especially to the type in which sound locators are employed to locate the craft at night with or without the use of searchlights. My invention also has more general application to fire control against any rapidly moving target, even for daylight use.

More particularly, my invention is an improvement on the type of nocturnal fire control device shown in my prior application for Universal anti-aircraft sight, Serial No. 88,082, filed June 30, 1936. According to this system, a false target is displaced in a horizontal plane in a direction determined by the movements of the sound locator in azimuth and elevation, and the amount of such displacement is made proportional to the ratio of the speed of sound to the estimated speed of the target, so that the angle between the line of sight as indicated by the sound locator and the line of sight on the false target is the sound lag error angle.

In such a device, the searchlight may be located at some distance from the sound locator, so that a parallax correction is necessary, and it is one of the objects of this invention to introduce such a parallax correction in a simple manner and so that when once introduced, the correction will be varied as the sound locator is turned in all planes, so that such correction is applied properly both as an azimuth and an elevation correction in all positions of the target.

Other objects of the invention are to simplify and improve upon the mechanism of the prior application, particularly as to the construction and operation of the sight itself.

Referring to the drawings, showing one form my invention may assume.

Fig. 1 is a diagram illustrating my complete anti-aircraft device.

Fig. 2 is a detailed side view showing the parallel linkage mounting of the box on which the false target is mounted.

Fig. 3 is a plan view of the central portion of the device (not showing the sound locating horns).

Fig. 4 is a vertical section through the control box for the false target, taken on line 4—4 of Fig. 5.

Fig. 5 is a horizontal section through the same, showing the drive for the rollers which revolve the ball.

Fig. 6 is a detail, partly in section, of the parallax mechanism.

Fig. 7 is a plan view of the same, partly in section.

Fig. 8 is a diagram illustrating the principles involved in the parallax mechanism.

Fig. 8A is a diagram showing the binoculars mounted adjacent the false target sight.

Fig. 9 is a transverse sectional view similar to Fig. 5, but showing a modified form of the invention.

Fig. 10 is a side view of this form.

Fig. 11 is a diagram showing the problem involved, being a horizontal projection of the target's course.

Referring first to Fig. 1, the conventional sound receiving horns are shown at 1, 2 and 3, which may be constructed and arranged somewhat as shown in the aforesaid prior application 88,082 and in greater detail in my prior application Serial No. 66,158, for Sound locator receivers, filed February 28, 1936. According to this system, the several horns are mounted for turning together in azimuth on framework supported from rotatable graduated base-ring 4, and also for rotation in elevation on a common supporting hollow shaft 5 journaled in bearings 6 and 6' on the framework (see Fig. 3). Scale 115 shows the elevation angle when read on index 116 (Fig. 3), while scale 117 shows the bearing angle (Fig. 1). For rotating the sound locator in azimuth, I show a handwheel 7, the operator of which wears helmet phones 8 and 9 connected to horns 1 and 2 through tubes 110 and 111. Similarly, the horns are turned in elevation from handwheel 10, the operator of which wears helmet ear phones 11 and 12 connected through suitable sound track tubes 112 and 113 to horns 2 and 3, the sound track from the horn 2 being divided, as shown in my aforesaid prior application No. 66,158.

As shown in Fig. 1, the rotation of the handwheel turns the ring or platform 4 through bevel gears 13 and pinion 14, meshing with an internal gear 15 in said ring. The rotation of the platform in azimuth carries with it, by means of arm 16, the sighting means proper 17. In this case, the sight is shown as in the form of a fixed eye piece 18 and a reflecting mirror or prism 19 mounted for movement in elevation on horizontal trunnions 20 and 20'. Said mirror preferably has suitable cross hairs 21 at the center thereof, which the operator brings into coincidence with the false target ball 22 by moving universal control handle 85.

The operation of the handwheel 7 also turns, through bevel gears 23, a shaft 24 which turns one arm of a differential 25 for the purpose hereinafter stated. Handwheel 7 also operates the sound lag angle determining device in box 56. This is shown as accomplished through sprocket 26 and chain 27, the latter passing around idlers 27' to drive a sprocket wheel 28 on the same sleeve with a second sprocket wheel 29 geared through chain 30 to sprocket wheel 31 on shaft 32. This drive rotates the sphere 33 in one plane through bevel gears 34, shaft 35 and friction drive disc 36.

Similarly, the elevation handwheel 10 turns the horns in elevation through shaft 10', bevel gears 37, shaft 38 and pinion 39, which meshes with a large gear sector 40 which turns the horns in elevation. At the same time the shaft 10' of handwheel 10 revolves a chain 41 through sprocket wheel 42, said chain revolving sprocket wheel 43 on shaft 44, the shaft 44 and the sleeve 28' being coaxial with the axis of rotation of housing 50. The shaft 44 is shown as having a second sprocket 45 thereon which drives, through chain 46, a sprocket 47 on the same sleeve 48 with a friction disc 49 positioned at right angles to the disc 36, which also drives the sphere 33.

The chains 30 and 46 are shown as housed within an arm or housing 50 journaled on the side of the main box 52 at a point 53 spaced from the axis of rotation of hollow shaft or tube 5, to which tube is secured bracket 55 which is formed as a fork at its outer end and within which the box 56, containing the ball 33 and its driving mechanism, is journaled on horizontal trunnions 57 and 57'. By means of this parallel linkage, the box 56 is maintained horizontal as it is bodily revolved in elevation about the center of hollow shaft 5, arm 50 being pivoted thereto at 53'.

On top of said box 56 is mounted the pantograph linkage 58 which carries the false target or ball 22. As explained in my prior application, the inner movable point 59 of said linkage is displaced from its neutral center line directly over the center of sphere 33 an amount proportional to the estimated air speed of the target, while the direction or path of the displacement is determined by the position of the roller 60, which is driven from the ball 33, and is carried by the vertical shaft 61 which is perpendicular to both shaft 35 and sleeve 48. Shaft 61 carries at its top a U-shaped bearing frame 62, which may be made in the form of a miniature airplane 63 and within which is journaled threaded shaft 64. Threaded on said shaft is a nut 66 which carries pin 59 swivelled to the inner end of the pantograph. A knurled thumb piece 67 rotates shaft 64 to position pin 59 for the estimated air speed, as shown by scale 68, and the movements of the sound locator will rotate the frame 62 and, with it, the miniature airplane, so that the miniature airplane always points in the direction that the target is flying, i. e., the path or plane of displacement of pin 59 is determined thereby.

It may be shown mathematically that the gear ratios between the elevation drive to roller 49 and between the azimuth drive to roller 36 should not be the same and, in fact, for theoretically perfect results, at least one drive, i. e., the ratio of the two drives, should be varied with a function of the angular elevation $\cos \emptyset \sin \emptyset$. For practical purposes, however, due to various factors such as sound refraction at low elevation angles and difficulty of operation at high elevation angles, the useful operating range of the sound locator is in the region of about 15 to 75 degrees elevation. For simplicity in design, therefore, in the preferred embodiment of my invention I take a mean value of $\cos \emptyset \sin \emptyset$ as .4 and make the gear ratios such that the speed of rollers 36 is .4 that of the speed of roller 49 for the same angular velocities of the sound locator in azimuth and elevation, i. e., roller 49 is designed to rotate 2.5 times as fast as the roller 36.

For introducing the parallax correction, I adjustably fix a second point 69 in the double pantograph arrangement. At this point is a connecting pin 70 projecting from a small plate 71 adjustably pivoted on top of a circular plate or disc 72, the latter being journaled in bracket 74, projecting from the box 56 by means of stub shaft 73. The plate 71 is shown as eccentrically pivoted at 75 to disc 72 and has a slot 76 adjacent its forward end so that it may be clamped in any position by means of clamp screw 77. An arbitrary scale 78 (Fig. 6) may be placed on disc 72, on which a reference mark 79 on plate 71 is read. When the reference mark is on zero, the pin 70 lies directly over the center of rotation of stub shaft 73, as shown in the figures, so that in this position no parallax correction is introduced. If, however, the plate is moved in the direction shown in dotted lines in Fig. 7, a parallax correction is introduced for the searchlight location. The direction of lateral displacement of the searchlight is introduced by turning disc 72, which has a directional arrow 80 thereon, so that it points directly at the searchlight. This may be accomplished by temporarily depressing a pinion 81 which normally engages a gear 82 secured to disc 72 and turning the arrow with the fingers to the proper position, after which the gears are re-engaged. The purpose of the gears is to maintain the arrow pointing at the searchlight regardless of the subsequent movements of the sound locator in azimuth. To this end, the gear 81 is driven from shaft 36' of azimuth friction disc 36, as by means of worm gearing on skew gearing 83, so that the arrow is turned in the reverse direction to the azimuthal movements of the sound locator, and at equal speed.

The effect of this parallax adjustment on the system may be seen from Fig. 8. In this figure, for the sake of simplicity, the point 59 is assumed to be adjusted for zero target speed and the target B is supposed to be very near the horizon, with the sound locator at L, the searchlight at S, and the false target at B'. Without a parallax correction, the searchlight would obviously be pointed on the dotted line SC parallel to the line LB connecting the sound locator and target. It is obvious that this beam would not strike the target, so that it is necessary to turn the beam backwardly in azimuth through an angle θ' to SB. Now draw LA parallel to SB and AB parallel to LS, and A'B' parallel to AB. It will be seen, by similar triangles, that $$\frac{A'B'}{LB'} = \frac{AB}{LB}$$

where A'B' is the distance it is necessary to move the false target to the left and LB' a constant in the machine. It is also obvious that AB=LS or, in other words, the base or horizontal distance between the sound locator and searchlight, which is known. LB is the slant range of the target at the time it is expected that it will be sighted. Therefore it is apparent that A'B' is proportional to $$\frac{LS}{\text{range}}$$

With the distance LS known and the range estimated, this ratio may be obtained from a table and set up on the arbitrary scale 78. With this adjustment, the ball 22 is moved from B' to A', where the target, sound locator and searchlight are in line. As the sound locator is revolved in azimuth and elevation, the false target will be moved around the circle C' of radius A'B'. Since, however, the false target is observed only through the sight 18 and the offset remains along arrow 80 pointed at the searchlight, the parallax correction will be correctly applied for all positions of the target, since the points on circle C' will be projected along a line connecting the eye and the ball under a similar theory of operation to that described in my prior application 88,082 in connection with the introduction of the sound lag angle correction (see Figs. 8 and 9 thereof). The result is that the parallax correction is correctly resolved into its proper components in azimuthal and elevational angles for all positions of the sound locator. There is, of course, superimposed on this motion due to parallax correction the sound lag correction due to the displacement of the point 59, as above described and more completely set forth in my prior application.

The introduction of either or both of these corrections results in a displacement of the false target 22 so that the line of sight must be readjusted to sight on the same from the position indicated by the sound locators. This readjustment is effected, in this form of the invention, by means of a crank-knob 85. This device may be bodily revolved in azimuth to turn sleeve 86, rotatably mounted in the bottom of the housing 87, on which the sight proper is mounted. Said sleeve is shown as having an arm 96 extending therefrom, in which shaft 95 of knob 85 is journaled. Mounted on said sleeve is a gear 88 which drives a gear 89 on shaft 90. On said shaft is a pinion 91 which meshes with a gear 92 secured to the base of the sight proper. Said shaft also turns the opposite arm of the differential 25 to the drive from the handwheel 7 through shaft 24. The planetary arm of said differential operates shaft 93 so that the transmitter 94 which transmits the azimuth readings to the searchlight transmits both the azimuth movements of the sound locator and the azimuth corrections as applied from the sight.

The elevation corrections are introduced by rotating knob 85 to turn shaft 95, journaled within arm 96. The rotation of shaft 95 lowers and elevates a short vertical shaft 98 by means of a pinion 99, the teeth of which engage circular teeth 100 cut around said shaft. The vertical movement of said shaft is transmitted through similar teeth to a pinion 101 and thence to an arm of the differential 25' opposite to the arm actuated through shaft 102 from elevation handwheel 10. The third arm of said differential actuates a shaft 103 which not only actuates the elevation transmitter 104 for controlling the searchlight, but also moves up and down a vertical shaft 105 through pinion 106 to move the mirror 19 in elevation about its trunnion axis 20. The difference in the drives from the two differentials is due to the fact that the sight is rotated in azimuth with the sound locators, but not in elevation, so that it is necessary to impart to the mirror one half the entire elevational movement of both the sound locators and the correction. The movements of shaft 105 rotate the mirror about trunnion 20 through pinion 107, gears 108 and gear sector 119 secured to the under part of the mirror support.

As hereinbefore stated, for a precise positioning of the following roller 60 at the true course angle θ, that is, the angle between the line connecting the sound locator and target and the horizontal projection of the target course (see Fig. 11) the relation is as follows:

$$\theta = \tan^{-1}\frac{V_L}{V_R}$$

where $V_R$ represents the horizontal component of the target's velocity ($V_T$) in the listening plane and $V_L$ the horizontal component normal to the listening plane. If the driving rollers 49 and 36 be driven at the same and constant ratio from the angular velocity of the sound locator ($\omega_\theta$ for azimuth and $\omega_\phi$ for elevation), then $$\theta = \tan^{-1}\frac{\omega_\theta}{\omega_\phi}$$

It can be shown mathematically, however, that this is not truly correct, that is, that tan $$\frac{V_L}{V_R}$$

does not always equal $$\tan^{-1}\frac{\omega_\theta}{\omega_\phi}$$

but that the true equation is $$\theta = \tan^{-1}\frac{\omega_\theta}{\omega_\phi}\cos\phi \sin\phi$$

where ∅ is the elevation angle. Therefore I propose, as shown in Fig. 9, to insert in the drive connecting the azimuth driving roller 36 to the azimuth movements of the sound locator a variable speed drive of speed ratio characteristics cos ∅ sin ∅, which may also be written ½ sin 2∅.

For this purpose I have caused the shaft 32 in Fig. 9, which is driven from the azimuth movements of the sound locator through a sprocket 31, as before, to drive a friction disc 130 with which engages a radially adjustable friction roller 131. Said roller is shown as splined on the shaft 132 and having secured thereto a collar 133, so that said roller is radially adjusted from a fork 134 which engages the collar and is mounted on a cam pin slider 135. Said pin is shown as having a squared section slidably mounted in horizontal slot 136 in the casing 56'. The pin portion 135' extends outwardly and engages a curved slot 137 formed in extension 138 from the forked arm 55' which pivotally carries the box 56', as in the main form of the invention. The curved slot 137 is so shaped that the pin 135' is held in its innermost position when the arm 55' is at 45°, in which position the roller 131 is driven at its maximum speed (since the sine of twice 45° is 1). The slot curves symmetrically away from pivot point 57 above and below the horizontal plane thereof so that the speed of the roller 131, as driven from disc 130, is diminished by being multiplied by a factor ½ sine 2∅.

On the shaft 132 is shown a pinion 139 which drives a gear 140 secured to the driving roller 36", said gear and roller being rotatably mounted on the shaft 35' which drives the gearing 83 for the parallax mechanism, the shaft 35' being shown as driven through bevel gears 34 directly from the shaft 32, so that the variable speed drive does not affect the parallax mechanism.

From the foregoing the operation of my invention should be apparent. The observers first set the arrow 80 to point toward the searchlight, and from their knowledge of the conditions affecting the illuminating range of searchlights and the type of the attacking bombers estimate the range LB and speed. The proper values are then set up on arbitrary scale 78 for the parallax correction and on speed scale 68, and as soon as the attacking plane is heard, the listeners start operating the azimuth and elevation handwheels 7 and 10 to follow the target with the sound locators, which, as explained, will position the false target 22 in line with the target. The observer through eye piece 18 maintains the line of sight on the false target, by which the proper angles in azimuth and elevation are transmitted from transmitters 94 and 104 to the searchlight or, preferably, to an intermediate or comparator station at which the binoculars are located and which retransmits the bearings to the searchlight, in accordance with the system shown in my prior joint patent with Preston R. Bassett #2,003,661, dated June 4, 1935, for Searchlight directors. As soon as the binocular observer sights the target, he assumes control of the transmission of angles to the searchlight.

If desired, the comparator station may be omitted and the angles transmitted directly to the searchlight. In this case, the binocular telescopes 140 are preferably mounted by the side of the eye piece 18 (Fig. 8A) and the mirror 19' lengthened so that it may be used both with the eye piece and the binoculars to sight the target, the binoculars being mounted on the same base 92 as the eye piece and movable therewith. Preferably, the binoculars are positioned close enough to the eye piece so that the observer may look with one eye through the eye piece and with the other eye through the adjacent eye piece of the binocular, so that as soon as the target is sighted, he may shift over both eyes to the binoculars and assume direct control through the knob 85, from which the transmiters 94 and 104 are controlled. The listeners may then continue to operate handwheels 7 and 10, if desired, although this may not be necessary, except that it facilitates picking up the target again if lost by the binoculars.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a sound locator for aircraft targets, the combination with sound responsive receivers mounted for turning in azimuth and elevation and a searchlight located at a distance therefrom, a sight mounted adjacent said receivers for turning movements in like planes, a spaced false target, and means for maintaining said false target in the true line of sight from said sight to the aircraft, including means for displacing said false target from the sound position line as determined by said receivers proportionally to the estimated speed of the aircraft, means for determining the direction of such displacement from the azimuth and elevation movements of said receivers, and means for giving said false target an initial lateral displacement respectively proportional to and opposite to the distance and direction of the searchlight from the sound locator, whereby the proper parallax is introduced for all positions of the sound locator.

2. In a sound locator for aircraft targets, mounted for rotation in azimuth and elevation, an adjacent sight mounted for rotation in azimuth and elevation, a pantograph spaced from the sight, means for moving the free end thereof from the movements of said sound locator, and dual means for independently adjusting the expansion of said pantograph in a horizontal plane to vary the position of a false target thereon on which said sight is trained, one of said means being positioned to correct for parallax due to the remote location of the searchlight and the other being controlled by the relative variation of the angular rates of rotation of the sound locator in azimuth and elevation and the target's speed.

3. A sound locator-searchlight corrector as claimed in claim 1, wherein the initial displacement of the false target is in line with but opposite to the searchlight displacement and of an amount proportional to the ratio between said searchlight displacement and the range of the target.

4. As a means for assisting in the positioning of a false target in a sighting device for use with anti-aircraft sound locators, a sphere mounted for rotation in all planes, a drive roller for rotating it in one plane, driven from the turning of the sound locator in azimuth, a second drive roller for rotating the sphere in a plane perpendicular to said first plane and driven from the turning of the sound locator in elevation, the ratio of the drive between the sound locator and the two rollers being approximately 2.5, and means positioned by said sphere for determining the resultant plane of rotation, said false target being positioned in part by said means.

5. As a means for assisting in the positioning of a false target in a sighting device for use with anti-aircraft sound locators, a sphere mounted for rotation in all planes, a drive roller for rotating it in one plane, driven from the turning of the sound locator in azimuth, a second drive roller for rotating the sphere in a plane perpendicular to said first plane and driven from the turning of the sound locator in elevation, a variable speed device between at least one of said rollers and the sound locator drive, means for varying the speed transmitted by said device in accordance with a function of the angular elevation of the sound locator, and means positioned by said sphere for determining the resultant plane of rotation, said false target being positioned in part by said means.

6. The combination with a sound locator for aircraft, of a sight and false target therefor for fixing the true line of sight from the indicated sound line, a computing device on which said false target is mounted, means for mounting said device for revolution in azimuth and elevation with the sound locator, means on said device for displacing said false target from the indicated sound line an amount proportional to the speed of the craft, means operated by the movements of the sound locator in azimuth and elevation for determining the direction of said displacement, and a second means for displacing said false target an amount for a parallax correction in the opposite direction to the direction of searchlight displacement from the sound locator.

7. In an anti-aircraft fire control mechanism, a primary device for continuously determining by direct observation the approximate angular position of the target in azimuth and elevation, a sphere, means for rotating the sphere about one axis from the azimuthal angular movements of said device, means for rotating said sphere about another axis perpendicular to the first axis from the elevation movements of said device, a variable speed device between at least one of said rotating means and said sphere, means for varying the speed transmitted by said device in accordance with a function of the angular elevation of the sound locator, a follower positioned about an axis perpendicular to both of said other axes of rotation in accordance with the resultant direction of rotation of said sphere about said first two axes, and means positioned by said follower, indicating the direction of the path of flight of the aircraft.

8. An aircraft locating device as claimed in claim 5, in which said variable speed device varies the speed of drive of the azimuth driving roller for the sphere proportionally to the sine of twice the angle of elevation of said locator.

9. The combination with a sound locator for aircraft, of a sight and false target therefor for fixing the true line of sight from the indicated sound line, a computing device for displacing said false target from the indicated sound line an amount proportional to the speed of the craft, means operated by the movements of the sound locator in azimuth and elevation for determining the direction of said displacement, a telescopic sight adjacent said other sight and movable therewith to facilitate sighting the real target without interference from the false target, and common means for transmitting the angular movements of said two sights to the fire control station.

10. The combination with a sound locator for aircraft, of a sight and false target therefor for fixing the true line of sight from the indicated sound line, a computing device for displacing said false target from the indicated sound line an amount proportional to the speed of the craft, means operated by the movements of the sound locator in azimuth and elevation for determining the direction of said displacement, transmitting means actuated from said sight for positioning the searchlight, and binocular sights adjacent said first named sight and adapted to actuate said transmitting means when the real target is sighted.

FRANK R. HOUSE.